US005778127A

United States Patent [19]
Gilliland et al.

[11] Patent Number: 5,778,127
[45] Date of Patent: Jul. 7, 1998

[54] OPTICAL TRANSCEIVER AND FILLER COMPOSITION

[76] Inventors: Patrick Gilliland, 5451 NE. River Rd., Chicago, Ill. 60656; Henning Backhauss, 924 Ontario St., Oak Park, Ill. 60303; Daniel Poplawski, 22 Woodcliff Rd., Montgomery, Ill. 60538

[21] Appl. No.: 472,385

[22] Filed: Jun. 7, 1995

[51] Int. Cl.⁶ .................................................. G02B 6/36
[52] U.S. Cl. ................................... 385/92; 385/93; 385/92
[58] Field of Search ................................... 385/88–94

[56] References Cited

U.S. PATENT DOCUMENTS 4,186,996  2/1980  Bowen et al. .................. 385/92
4,733,932  3/1988  Frenkel et al. ................. 385/94 X
5,191,629  3/1993  Kaiser ............................. 385/90
5,353,294  10/1994 Shigeno .......................... 385/93 X
5,414,787  5/1995  Kurata ............................. 385/92

OTHER PUBLICATIONS

Dow Corning, Information About Silicone Elastomers, 1991.

*Primary Examiner*—Phan T. H. Palmer
*Attorney, Agent, or Firm*—David L. Newman, Esq.

[57] ABSTRACT

An optical transceiver apparatus is provided having a housing including a diode package aligned with a lens and having an optical filler composition injected therebetween. The optical filler composition comprises a silicone elastomer which may be used as an index matching element, as a positioning and locking means, or an optical attenuator.

21 Claims, 1 Drawing Sheet

OPTICAL TRANSCEIVER AND FILLER COMPOSITION

The present invention relates to an optical filler composition and in particular a silicone elastomer used for an optical filter.

Optoelectronic transceivers are known in art having a laser diode or photo diode providing transmission or reception, respectively mounted in a housing which is linked to an optical wave guide such as a fiber optic connector. Oriented between the laser diode and optical wave guide are optical components such as a lens or other refractive elements. It is sometimes useful to fill the gap between the laser diode and the optical element with a composition such as an epoxy or gel. Such compositions may commonly be used for index matching. However, none of the commonly known elements are inexpensive or easy to use or are used for purposes of optical attenuation. It is therefore, an object of the present invention to provide a filler composition which is easily and readily available and may be applied to an optical transmitting or receiving apparatus, quickly and easily.

It is a further object of the present invention to provide a composition which may be used as an optical attenuator at a given wavelength.

It is a further object of the present invention to provide a composition which fixes optical elements in position.

SUMMARY OF THE INVENTION

A principal object of this invention is to provide an optical transmitter or receiver apparatus comprising a housing having a first end and a second end, a diode package at the first end, an optical waveguide receiving bore at the second end, a communication channel between the diode package and the bore, and an optical filler composition comprising a silicone elastomer which cures at room temperature. The optical filler composition is a room temperature vulcanizing composition which provides attenuation from zero to eleven dB at a wavelength of eight hundred and fifty nanometers. The optical filler composition having a peel strength of between twenty and thirty parts ppi at ten days at 230° C. The optical filler composition having a refractive index of between 1.3 and 1.5 at 77° F.

These and other features of the invention are set forth below in the following detailed description of the presently preferred embodiments.

DETAILED DESCRIPTION OF THE PRESENTLY PREFERRED EMBODIMENTS

Figure 1:
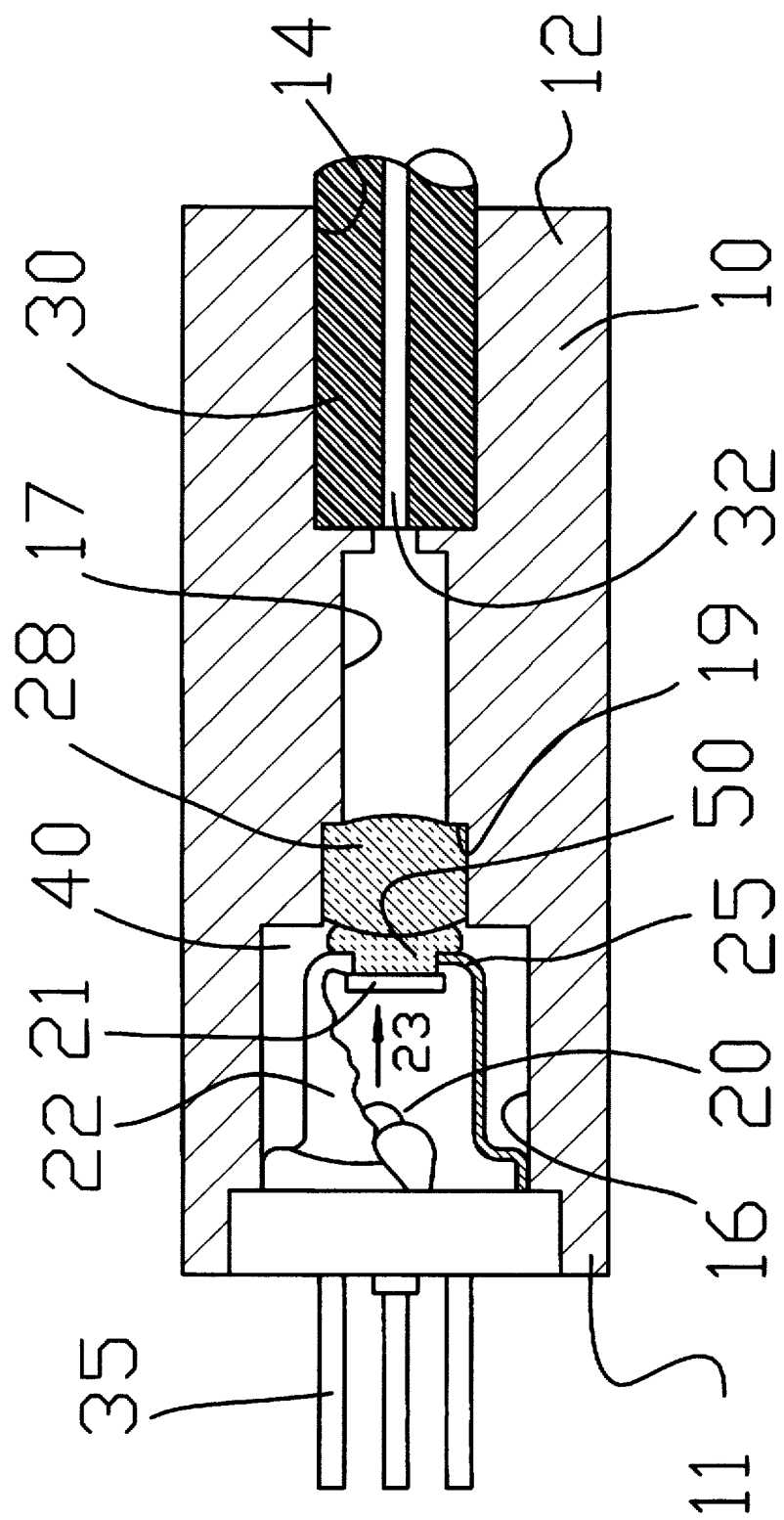
FIG. 1 is a plan view of an optical transmitter apparatus of the present invention.

The present invention relates to an optical transmitter or receiver apparatus such as disclosed in FIG. 1 which shows an optoelectronic transmitter having a housing 10, a laser diode 20, housed in a diode package 25 oriented at a first end 11 of the housing. A second end of the housing 12 includes a bore 14 for receiving an optical waveguide and a ferrule 30. The diode package 25 in a preferred embodiment is a TO-56 package. The diode package 25 contains a laser diode 20 and a cover glass 21. In an alternative embodiment, the diode package 25 may include a photo diode. The diode package 25 includes a cover 22 which is partially broken away so that the laser diode 20 is visible. The laser diode 20 transmits photons in the direction of arrow 23 through the cover glass 21 and through lens 28. The lens 28 focuses the light rays to be transmitted through channel 17 to be received by optical fiber 32 of the ferrule 30 and to be carried along an optical waveguide attached thereto (not shown). The diode package 25 is mounted in aperture 16 of the housing at a first end 11 of the housing. Thus, the aperture 16 at the first end 11 and the bore 14 at the second end 12 are joined by the channel 17 therebetween which provides communication between the aperture 16 and the bore 14. The aperture 16, channel 17 and bore 14 are precision aligned so that the transmission pathway of the laser diode 20 provides for the greatest transmission of signals into and through the optical fiber 32 of the ferrule 30 aligned in the bore 14. The bore 14 is centered to the channel 17. The diode package 25 is inserted in the aperture 16 and measurements are taken to determine the transmission path of the laser diode 20 and to determine the centered orientation of the diode package 25. Upon determining its centered position, a locking means is provided in order to lock the diode package 25 in position to the housing 10. The diode package 25 includes contact tails 35 for electrical attachment to a peripheral device or a printed circuit board to which the housing 10 may be mounted.

In a preferred embodiment, the locking means may be a mechanical means such as a screw or via epoxy which cements the diode package 25 in a nonmovable position. Such alignment provides lateral alignment of the diode package 25. Axial alignment of the diode package 25 is not as crucial in that in the preferred embodiment the diode package is in close proximity to the lens 28 and does not affect the dispersion characteristics of the laser diode 20 to a large degree.

In a preferred embodiment, a gap 40 of approximately 0.012 inches is provided between the end of the diode package 25 and the lens 28. The gap 40 is filled with an optical filler composition 50. The lens is mounted within a socket 19 between the aperture 16 and channel 17. In a preferred embodiment, the housing 10 is injection molded of a polymer material such as valox providing for the precision aligned aperture 16, socket 19, channel 17 and bore 14. By injection of the optical filler composition 50 within the gap 40, the lens 28 is forced into the socket 19 and secured in a nonmovable position.

The optical filler composition used in a preferred embodiment is a silicone elastomer which cures at room temperature on exposure to water vapor in air. The optical filler composition 50 provides a dual purpose of holding the lens 28 in place within the housing 10 and also attenuating the transmission of the laser diode 20. In a preferred embodiment, the optical filler composition 50 is comprised of a silicone elastomer such as a room temperature vulcanizing (RTV) compound. For example, Dow Corning® 732 multi-purpose sealant (Dow Corning Corporation, Midland, Mich.) has been used with good results. The optical filler composition 40 of the preferred embodiment has a smaller index of refraction than the lens 28 but higher or equal to the index of refraction of the cover glass 21. The refractive index of Dow Corning® 732 multi-purpose sealant is 1.4059 at 77° F. Dow Corning® 732 multi-purpose sealant has a peel strength of approximately 20 ppi at 230° C. and ten days.

In a preferred embodiment, the optical filler composition 50 contains a percentage by weight of 81–83% hydroxy-terminated dimethylsiloxane; 11% amorphous fumed silica; 2% methyltriacetoxysilane; and 2% ethyltriacetoxysilane. The optical filler composition may be either clear or colored. The colored compositions may be used in order to provide attenuation. While only slight attenuation occurs by using a clear composition, in certain embodiments, a controlled degree of attenuation is desired. It is desirable in some circumstances to use a high powered laser in order to attain high transmissions speeds. In such instances, in order to ensure safety of the laser to avoid harmful eye exposure, attenuation is desirable. As shown in the examples below, a black optical filler composition was used which provided attenuation levels of 10.5 db at 850 nanometers. A clear-optical filler composition of the present invention provided for an attenuation of 0.2 dB at 850 nanometers. Both of these compositions are available as a ready-mixed composition and do not need addition of any other elements and are easily injected into the gap 40 of the housing 10.

In an alternative embodiment, the optical filler composition may be mixed in order to provide intermediate attenuation levels. As shown in Example 3 below, a one-to-one mixture of the clear and black optical filler composition achieved an attenuation level of 3.0 dB at 850 nanometers.

In a further embodiment, the optical filler composition may also be used in a receiver apparatus in order to provide for increased optical return loss.

EXAMPLE 1

An attenuation test was conducted with clear Dow Corning® 732 multi-purpose sealant filling a gap of 0.012 inches which gave a result of 0.2 dB at 850 nm.

EXAMPLE 2

An attenuation test was conducted using black Dow Corning® 732 multi-purpose sealant filling a gap of 0.012 inches which gave a result of 10.5 dB at 850 nm.

EXAMPLE 3

An attenuation test was conducted using a mixture of one part black Dow Corning® 732 multi-purpose sealant and one part clear Dow Corning® 732 multi-purpose sealant in a gap of 0.012 inches which gave a result of 3.0 dB at 850 nm.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An optical transmitter or receiver apparatus comprising:

a housing having a first end and a second end;

a diode package at the first end and a lens adjacent the diode package;

an optical waveguide receiving bore at the second end;

a communication channel between the diode package and the bore; and an optical filler composition selected from the group consisting of a solid or a liquid adjacent the diode package said optical filler composition provides for attenuation of between 1 and 11 dB at a wavelength of 850 nm.

2. The apparatus of claim 1 wherein said optical filler composition comprises a room temperature vulcanizing silicone composition.

3. The apparatus of claim 1 wherein the optical filler composition has an index of refraction of between 1.3 and 1.5 at 77° F.

4. The apparatus of claim 1 wherein the optical filler composition has a peel strength of between 20 and 30 parts per inch at 230° C. at 10 days.

5. The apparatus of claim 1 including a lens adjacent the diode package forming a gap between the lens and the diode package and the optical filler composition in the gap.

6. The apparatus of claim 1 wherein the diode package includes a laser diode.

7. The apparatus of claim 1 wherein the diode package includes a photo diode.

8. The apparatus of claim 1 wherein the optical filler composition comprises an optically clear add an optically attenuated material.

9. The apparatus of claim 1 wherein a fiber optic filler is received by the bore of the housing.

10. The apparatus of claim 1 wherein the diode package is precision aligned within an aperture of the housing.

11. The apparatus of claim 1 wherein the optical filler composition has an index of refraction that is smaller than the index of refraction of the lens but greater than or equal to the index of refraction of a cover glass of the diode package.

12. An optical transmitter or receiver apparatus comprising:

a housing having a first end and second end;

a diode package precision aligned within an aperture at the first end;

a waveguide bore at the second end;

a communication channel between the first end and the second end;

a lens mounted in a socket communicating with the channel at a first side and the aperture at the second site;

a gap between the transmitting/receiving end of the diode package and the lens; and a room temperature vulcanizing silicone optical filler composition in the gap.

13. The apparatus of claim 12 wherein the diode package is a laser diode.

14. The apparatus of claim 12 wherein the diode package is a photo diode.

15. A method of assembling an optical transmitter or receiver apparatus, including the steps of:

molding a housing having a precision aligned aperture at a first end and a precision aligned bore at a second end and a communication passageway therebetween;

mounting a diode package within the aperture;

mounting a lens adjacent the apex; and injecting an optical filler composition between the diode package and the lens wherein the optical filler composition comprises an optically clear and optically attenuated material.

16. The method of claim 15 wherein the diode package is aligned within the aperture of the housing via a mechanical locking means.

17. The method of claim 15 wherein the optical filler composition provides for attenuation.

18. The method of claim 15 wherein the optical filler composition secures the lens in a nonmovable position.

19. The method of claim 15 wherein the optical filler composition provides for increasing optical return loss of a photo diode.

20. The method of claim 15 wherein the optical filler composition comprises black room temperature vulcanizing silicone and clear room temperature vulcanizing silicone.

21. An optical transmitter or receiver apparatus comprising:

a housing having a first end and a second end and a lens adjacent the diode package;

a diode package at the first end;

an optical waveguide receiving bore at the second end;

a communication channel between the diode package and the bore; and an optical filler composition adjacent the diode package having an index of refraction that is smaller than the index of refraction of the lens but greater than or equal to the index of refraction for a cover glass of the diode package.

\* \* \* \* \*